United States Patent [19]

Puppolo et al.

[11] 4,267,565
[45] May 12, 1981

[54] COPPER ENCASED FLAT ELECTROLYTIC CAPACITOR MANUFACTURE AND CAPACITOR

[75] Inventors: Henry F. Puppolo, North Adams; Mark Markarian, Williamstown, both of Mass.

[73] Assignee: Sprague Electric Company, North Adams, Mass.

[21] Appl. No.: 26,467

[22] Filed: Apr. 2, 1979

[51] Int. Cl.³ .......................... H01G 9/00; B01J 17/00
[52] U.S. Cl. .................................. 361/433; 361/272; 357/72; 357/74
[58] Field of Search .................... 361/433, 271, 272; 357/72, 74; 29/570

[56] References Cited

U.S. PATENT DOCUMENTS

| | | | |
|---|---|---|---|
| 2,057,790 | 10/1936 | Potter et al. | 361/433 |
| 2,638,523 | 5/1956 | Rubin | 361/433 |
| 3,239,595 | 3/1966 | Reese et al. | 357/72 |
| 3,364,567 | 1/1968 | Brown et al. | 357/72 |
| 3,431,473 | 3/1969 | Cormier et al. | |
| 3,491,275 | 1/1970 | Puppolo et al. | |
| 3,833,427 | 9/1974 | Land et al. | |
| 4,198,742 | 4/1980 | Ramer et al. | 361/433 |

FOREIGN PATENT DOCUMENTS

| | | | |
|---|---|---|---|
| 1586782 | 2/1970 | France | 361/433 |
| 1558945 | 9/1980 | United Kingdom | |

*Primary Examiner*—Andrew J. James
*Attorney, Agent, or Firm*—Connolly and Hutz

[57] ABSTRACT

A copper-encased flat electrolytic capacitor is produced by sealing the capacitor unit in a heat-sealable polymer-copper laminate. The polymer side of the laminate is adjacent the capacitor section, and the copper side forms the exterior of the sealed unit. Leads may be attached to opposite surfaces of the capacitor, or electrical connection may be made prior to sealing, e.g., to leg-like extensions of the laminate that, after sealing, serve as the leads.

7 Claims, 5 Drawing Figures

COPPER ENCASED FLAT ELECTROLYTIC CAPACITOR MANUFACTURE AND CAPACITOR

BACKGROUND OF THE INVENTION

This invention relates to the manufacture of a flat electrolytic capacitor sealed in a polymer-copper laminate, the copper side forming the exterior of the case. The leads may be an integral part of the case or attached directly thereto by soldering or welding.

It is known to produce capacitors heat-sealed in various plastics, polymers, and laminates. However, the bending and flexing of the leads during testing and soldering or attachment to circuit boards frequently weakens or breaks the bond between the encasement and the leads, leading to failure of the capacitor because of ingress of contaminants or leakage of electrolyte.

SUMMARY OF THE INVENTION

One of the purposes of this invention is to provide a sealed flat capacitor in which the case serves as the leads or provides a conductive surface for attachment to leads thereto.

Another feature of this invention is the provision of an internal insulating layer and vapor barrier as part of the case.

These features are attained by sealing a flat capacitor in a heat-sealable insulating polymer-copper laminate.

Basically, an impregnated capacitor is heat-sealed between layers of a polymer-copper laminate with the polymer portion next to the capacitor, and the laminate is heat-sealed along the periphery of the two laminates. The copper surface forms the exterior of the capacitor.

The laminate may be a heat-sealable laminate of polyester, polyolefin, perfluoroethylene, or cellophane with a copper-clad aluminum or electroplated copper foil. Alternately, a polymer-aluminum foil-polymer-copper laminate or a polymer-polyester-polymer-copper may be used.

DESCRIPTION OF THE PREFERRED EMBODIMENTS

Figure 1:
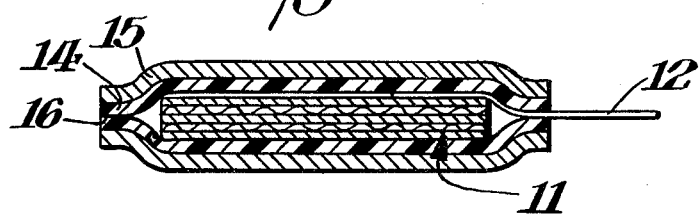
FIG. 1 is a cross-section of a heat-sealed capacitor through one of the electrode tabs.

Referring to FIG. 1, a capacitor section 11 consisting of an anode and a cathode separated by an electrolyte is sealed between layers of an insulating polymer-copper laminate 14, 15 with the polymer side 14 next to the capacitor section and the copper side 15 forming the exterior of the unit. Electrode tab 12 extends beyond the laminate which is heat-sealed at least around the periphery as indicated by 16.

Figure 2:
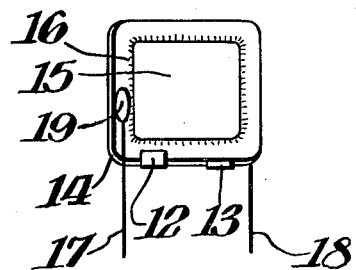
FIG. 2 is a top view of the heat-sealed capacitor of FIG. 1 with external leads.

FIG. 2 shows a top view of the sealed unit of FIG. 1 with leads 17, 18 attached. Extending electrode tabs 12 and 13 are bent into contact with respective copper surfaces 15 after the unit has been heat-sealed around the periphery 16. The polymer layers 14 of the laminates insulate the top from the bottom of the unit. Leads 17 and 18 are attached by soldering or welding 19.

Instead of attaching leads, the upper and bottom surfaces 15 of the case may be used instead. It is preferable in this embodiment to clip or notch, etc., the case so that it will only fit one-way in its intended receiver instead of simply marking the case as to anode and cathode surfaces.

Figure 3A:
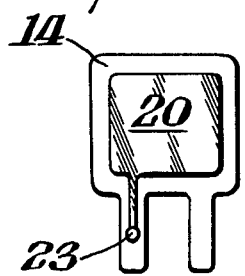
FIGS. 3A, 3B, and 3C show a sequence of making another embodiment in which the case forms the leads.
Figure 3B:
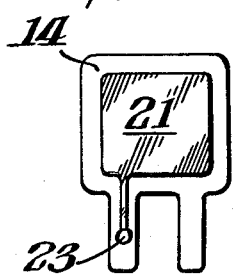
Figure 3C:
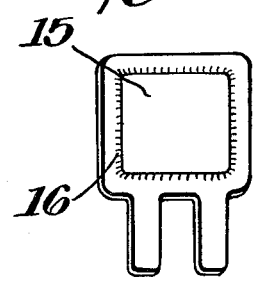

FIGS. 3A, 3B, and 3C show a sequence in the manufacture of the sealed units in which the leads are integral extensions of the case. A polymer-copper laminate 14, 15 is cut larger than the anode foil 20 and the cathode foil 21 with a leg-like extension. Anode foil 20 is placed on the polymer side 14 of one laminate, and cathode foil 21 is similarly placed on polymer side 14 of another congruent piece. A portion of polymer is removed from the leg of each laminate, and electrode tabs are attached at 23 to the underside of the copper surfaces 15, preferably by welding. After addition of electrolyte (not shown), the layers are superimposed, with copper surfaces 15 outward, and are heat-sealed at least around the periphery 16 and completely on the leg-like extensions which then serve as plug-in leads.

A flat capacitor with attached electrode tabs is inserted between layers of heat-sealable, insulating polymer-copper laminate with the polymer sides adjacent the capacitor. The assembly is placed in a heat-sealing unit and sealed at least around the periphery.

In manufacturing the units on a production line, it is preferable to use anodized foil as the anode to which electrode tabs are attached at regular intervals, and cathode foil with spaced electrode tabs attached. Soft paper spacer material is folded in half lengthwise, and the anode foil inserted in the fold. Cathode foil with electrode tabs extending half its width is similarly folded, and the anode-spacer assembly is fed into it. This assembly is fed into folded spacer material to produce a continuum of sections.

The sections may then be fed onto the polymer-copper layer, polymer side 14 adjacent the sections, impregnated by injecting electrolyte onto the paper, and covered with another layer of laminate 14, 15. The units are cut apart and heat-sealed. The electrode tabs 12 and 13, as shown in FIG. 2, are folded and welded to their respective copper layers 15, and leads 17, 18 are attached to the copper surface, or the unit is registered, e.g., by clipping one corner, to permit use in only one spacial arrangement with the case serving as the leads.

In the embodiment of FIGS. 3A, 3B, and 3C, the anode foil is encased in paper spacer material as above and cut adjacent the electrode tab into individual anodes with attached tab. The individual anodes are placed on the polymer side 14 of a heat-sealable, insulating polymer-copper laminate 14, 15 in the shape of but slightly larger than the final unit and with leg-like extensions corresponding to the spacing of the electrode tabs. The anode tab extends part-way down one of these legs. A portion of the polymer 14 adjacent the end of the tab either has been removed or is removed, and the tab is electrically connected, preferably by welding to the copper 15 through the hole in the polymer. The cathode is assembled similarly. Electrolyte is dropped onto the paper saturating it, and the layers are placed one over the other, polymer sides together. The unit is then heat-sealed completely through the legs and at least around the periphery 16 of the rest of the unit to form the finished capacitor with plug-in integral leads.

The polymer part 14 of the laminate may be heat-sealable polyester, polyolefin, perfluoroethylene, or cellophane and preferably is a heat-sealable polyethylene.

The copper portion 15 may be copper foil, electrotinplated copper, or copper-clad aluminum. The laminate may also contain an aluminum foil layer, e.g., be a polyethylene-aluminum foil-polyethylene-copper clad aluminum laminate, when a redundant vapor barrier layer and extra safety from copper ion contamination of electrolyte is required. In this case, if this laminate is used in the embodiment of FIG. 3, a portion of the aluminum layer must be removed as well as polymer for electrode tab attachment to the copper legs. Alternately, a polyethylene-Mylar-aluminum-polyethylene-copper laminate may be used, where the Mylar acts to prevent ion migration and short-circuiting.

What is claimed is:

1. A copper-encased sealed flat capacitor comprising a flat impregnated capacitor section with associated spacers and electrode tabs, said section being housed between two layers of an insulating heat-sealable polymer-copper laminate, the polymer portion of both of said layers being adjacent said section and sealed together around the periphery thereof, one of said electrode tabs contacting the copper portion of one of said layers and the other of said electrode tabs contacting the copper portion of the other of said layers.

2. A capacitor according to claim 1 wherein said section comprises an anodized anode foil with said associated electrode tab located with a fold of spacer located within a folded cathode foil with its associated electrode tab.

3. A capacitor according to claim 1 wherein each of said electrode tabs extends through said periphery and is bent opposite to the other into contact with the respective copper surface.

4. A capacitor according to claim 3 wherein leads are attached to said respective copper surfaces.

5. A capacitor according to claim 1 wherein each of said laminates has a leg-like extension to which the anode and cathode tabs are electrically connected, said extensions being heat-sealed with the rest of the unit forming integral terminals thereof.

6. A capacitor according to claim 1 wherein the polymer portion of the laminate is chosen from the group of heat-sealable polyester, polyolefin, perfluoroethylene, cellophane, and the copper portion of the laminate is chosen from the group of electrotinplated copper and copper-clad aluminum.

7. A capacitor according to claim 1 wherein said laminate is chosen from the group of polyethylene-electrotinplated-copper, polyethylene-aluminum foil-polyethylene-copper clad aluminum, and polyethylene-polyester-polyethylene-electrotinned copper laminate.

* * * * *